United States Patent

Miyashita

[15] 3,677,649
[45] July 18, 1972

[54] SIMPLE SPECTROMETER

[72] Inventor: Keiji Miyashita, 18-10, 5-chome, Kami Renjaku, Tokyo, Japan

[22] Filed: Nov. 4, 1970

[21] Appl. No.: 86,674

[30] Foreign Application Priority Data

Dec. 17, 1969 Japan..................................44/100880

[52] U.S. Cl.................................................356/74, 356/98
[51] Int. Cl..........................................................G01j 3/28
[58] Field of Search......................................356/74, 76–79, 356/98–100

[56] References Cited

UNITED STATES PATENTS

| | | | |
|---|---|---|---|
| 1,526,504 | 2/1925 | Rabi | 356/98 |
| 2,431,734 | 12/1947 | Cutting | 356/98 |
| 3,024,693 | 3/1962 | Harmon | 356/98 |

*Primary Examiner*—Ronald L. Wibert
*Assistant Examiner*—F. L. Evans
*Attorney*—Wenderoth, Lind & Ponack

[57] ABSTRACT

A simple spectrometer. A box has a top with a first lever pivotally mounted on the outside surface of the top at a point B with a scale moving needle on the end thereof spaced from the pivot a distance equal to the distance between point B and a point A. A graduated wave length scale is pivotally mounted on the top at point A and is coupled to the first lever for pivotal movement around point A as the first lever pivots around point B and in proportion to the movement of the first lever. A second lever is mounted on the inside surface of the top for movement about said point B and is coupled to the first lever for movement with the first lever. A spectrum registering needle is mounted on the free end of the second lever and projects into the box. The box has an opening in the side at a point C in line with points A and B and a replica of a diffraction grating is mounted in the opening. The box further has a slit in the side thereof opposite the diffraction grating. Light means are provided within the box controllable from outside of the box for illuminating the spectrum-registering needle. When light comes through the slit and falls on the replica of the diffraction grating and the levers are moved to locate the spectrum registering needle in register with the line spectrum on the replica of the diffraction grating, the scale moving needle moves along the graduated scale to indicate the wave length of the line spectrum.

3 Claims, 9 Drawing Figures

Patented July 18, 1972

KEIJI MIYASHITA, Inventor

By Wenderoth, Lind & Ponack

Attorneys

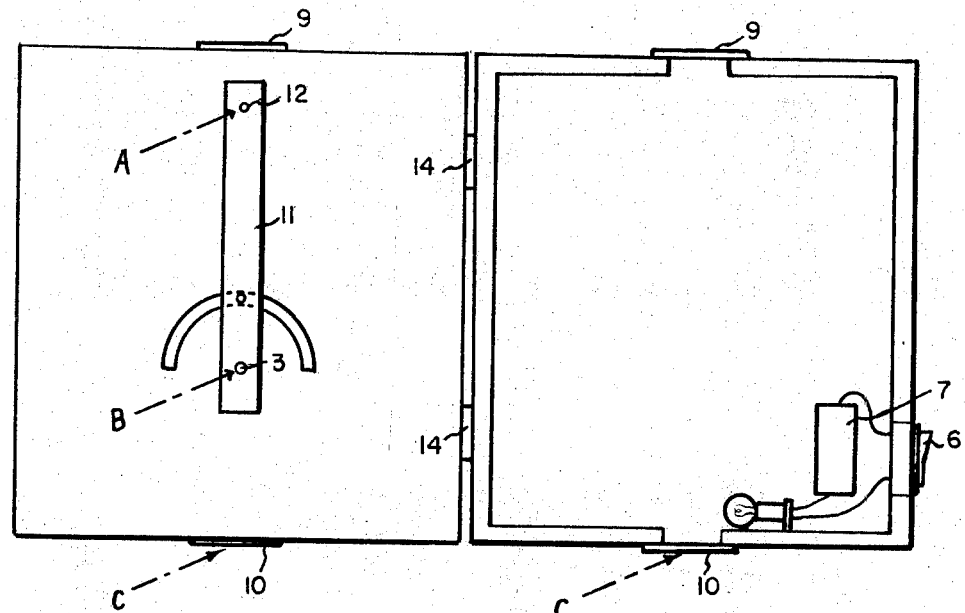
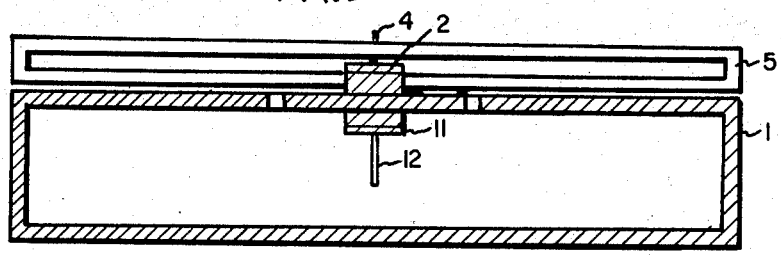
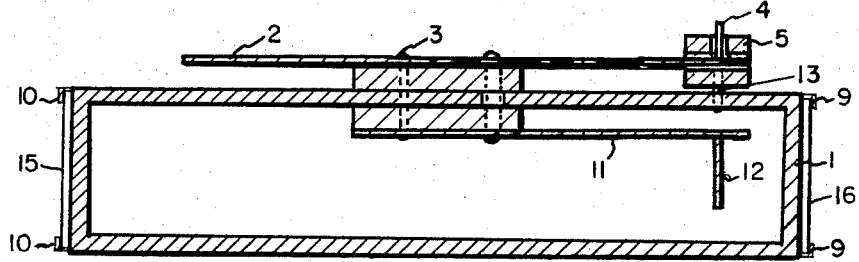

DIFFRACTION GRATING

KEIJI MIYASHITA, Inventor

SIMPLE SPECTROMETER

BACKGROUND OF THE INVENTION

The prior art spectrometers have been extremely difficult and troublesome to use and to correctly adjust, and also they must be used in a dark room. Further, they are very costly and therefore unsuited for use as a teaching instrument at a school. The present invention seeks to provide a simple spectrometer which need not be used in a dark room for measuring and which is easy to operate, inexpensive and has high precision.

BRIEF SUMMARY OF THE INVENTION

The simple spectrometer according to the present invention requires no dark room since it has an outside pointer and an inside pointer movable in interlocked relation, and also has a graduated scale movable relatively to said pointers, so that the measuring operation can be conducted with extreme ease and with high precision. Further, the present device is easy to adjust and repair and is small in size and light in weight, so that it is extremely convenient for maintenance and handling and can be manufactured at low cost.

BRIEF DESCRIPTION OF THE DRAWING

FIG. 2 is a plan view of the device with the top cover opened,

FIG. 3 is a front sectional view,

FIG. 4 is a sectional view taken from the right side of the device,

DETAILED DESCRIPTION OF THE INVENTION

Figure 1:
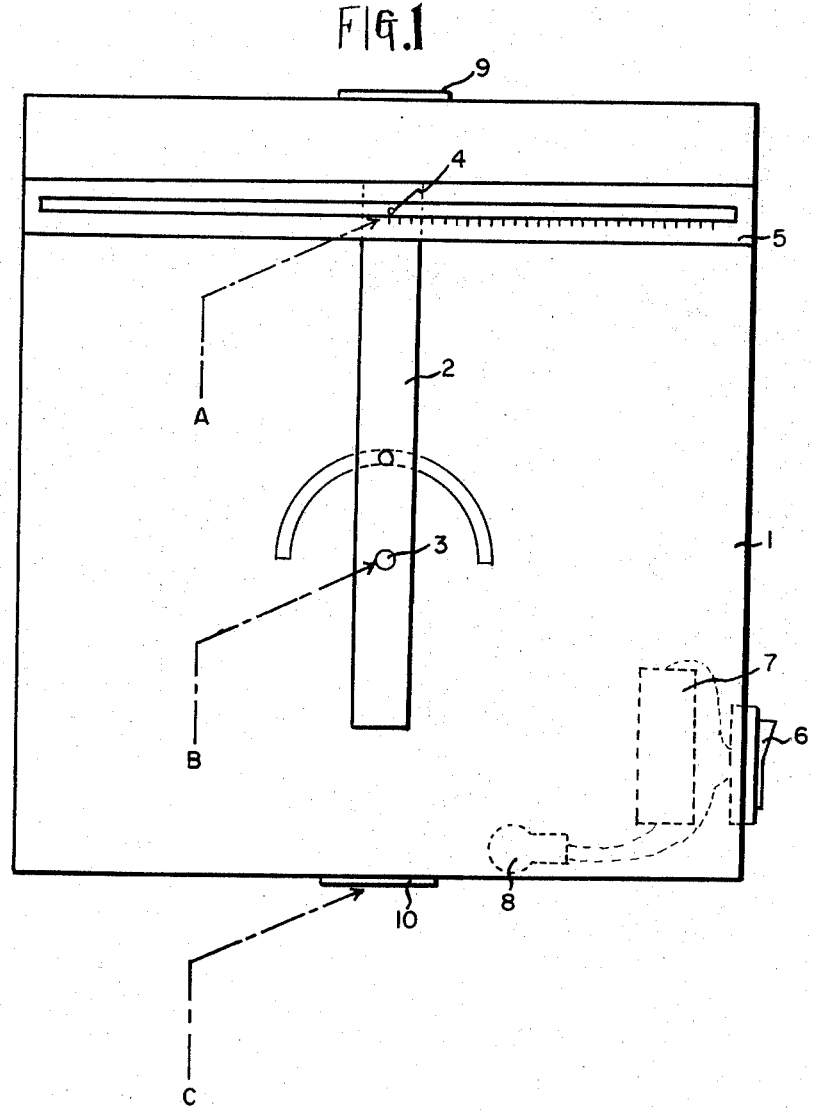
FIG. 1 is a plan view of the device according to the present invention.
Figure 6A:
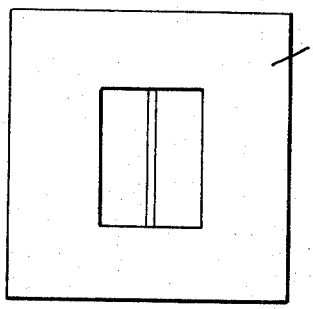
FIGS. 6a and 6b and 7a and 7b are front and side elevations of a slit and a replica of a diffraction grating, respectively.
Figure 6B:
Figure 5:
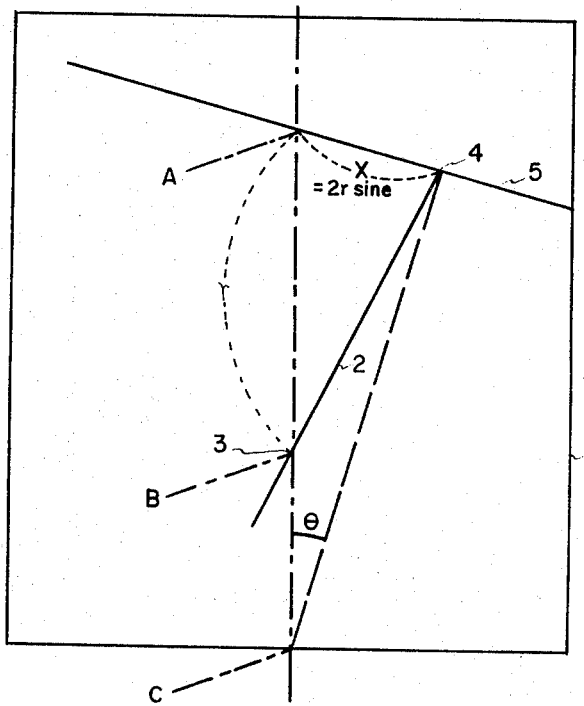
FIG. 5 is a diagram illustrating a manner for use of the present device.
Figure 7A:
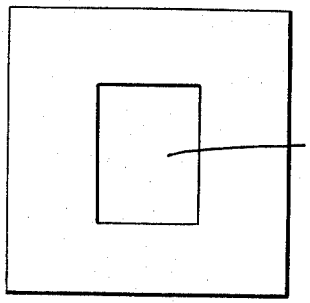
Figure 7B:

The structure of the present invention will be described in detail hereinbelow with reference to the drawings. A point C is situated at the middle of a side of the square surface of the top cover of a box 1 which is adapted to serve as a dark room. Then a point A is located at a suitably selected vertical distance from said point C, and at the middle of the line connecting said points A and C is located a point B. A pivot 3 is provided at the point B on the surface of the top cover, and then a lever 2 adapted to operate for measuring the wave-length of light is provided in such a manner as to be movable about said pivot 3, the latter serving as a fulcrum. At an end of said lever is provided a scale moving 4 located at the distance B–A from the pivot 3. Another pivot 13 is disposed at the point A on the top cover surface, and a scale 5 marked with graduations in wave-lengths is rotatably mounted on said pivot 13 which serves as a fulcrum. Said scale also has a needle receiving grave along the length thereof of a size sufficient to allow movement of the wave-length measuring needle 4 therein. On the underside of the top cover is provided a lever 11 which is mounted on said pivot 3 and coupled to said lever 2 so that it remains immediately below the lever 2 parallel thereto as said levers 3 and 11 move about the pivot 3. As will be also seen, a needle 12 for indicating when the scale 5 is in register with the light spectrum is mounted on lever 11 at the distance B–A from the pivot 3. It will thus be understood that the scale moving needle 4 and the spectrum registering needle 12 are aligned vertically with the box 1 is hinged on the box on hinges 14 so that it can be freely opened or closed. On the inner bottom face of the box 1 are secured a battery 7 and a miniature electric bulb 8, and on the outer side face of the box is provided a change-over switch 6 in proximity to the battery 7. The battery 7, bulb 8 and switch 6 are electrically interconnected. At the point C in the side face of the box 1 is formed an opening over which a diffraction grating replica 12 is mounted in mounting means such as channel member 10, and in the opposite side of the box, opposed to said opening, is also formed a light inlet opening over which a slit containing member 16 is mounted in mounting means such as channel members 9 as shown.

In use of the present device, first the slit is directed toward the source of light to be analyzed, and while observing through the replica the spectrum of the light entering through said slit, the miniature bulb (which gives sufficient brightness to allow easy perception of the spectrum-registering needle 12) is lighted by actuating the switch 6, then the lever 2 is moved so as to locate the needle 12 in register with the line spectrum the wave length of which is to be measured, and the operator reads the graduation pointed to by the needle 4. Assuming that the wave-length of the registered line spectrum is $\lambda$, the lattice constant of the replica of the diffraction grating is $d$, the distance from the reference point A of the scale to the outside needle 4 is X, the radius of the circle described by rotation of the needle 4, that is to say, the distance between the points A and B, is $r$, and the angle of diffraction of the line spectrum is $\theta$, the following equations can be written as regards the primary spectrum: $\lambda = d \sin \theta$ and $X = 2r \sin \theta$, hence $$\lambda = \frac{d}{2r} X.$$

As for the standard spectrum (for instance, the green bright line of a fluorescent lamp where $\lambda = 0.546\ \mu$), if the value of X determined for such standard spectrum is assumed to be $X_0$, the equation obtained will be:

$$\lambda_0 = \frac{d}{2r} X_0, \text{ hence } \lambda = \frac{\lambda_0}{X_0} X.$$

Therefore, if $\lambda_0/X_0$ is previously calculated, it is possible to obtain the wave-length $\lambda$ of such standard spectrum by determining X. In case the needle 12 is seen lying on the slit and the needle 4 is not registered with zero of the graduation scale 5, the zero correction is made. It is preferred to use a narrow slit for a bright spectrum and a wide slit for a dark spectrum.

We claim:

1. A simple spectrometer comprising a box having a top, said top having a first point at the middle of one side thereof, a second point spaced from the first point in a direction perpendicular to said one side thereof, and a third point midway between the first two points, a first lever pivotally mounted on the outside surface of said top at said third point and having a scale moving needle on the end thereof spaced from said pivot a distance equal to the distance between said second and third points, a graduated wave length scale pivotally mounted on said top at said second point and being coupled to said first lever for pivotal movement around said second point as said first lever pivots around said third point and in proportion to the movement of said first lever, said scale moving needle moving along said graduated wave-length scale during said movement, a second lever mounted on the inside surface of said top for pivotal movement about said third point and coupled to said first lever for movement with said first lever, a spectrum-registering needle on the free end of said second lever projecting into said box, said box having an opening in the side corresponding to the side of the top along which said first point is located and at a position corresponding to said first point, a replica of a diffraction grating mounted in said opening, said box further having a slit in the side thereof opposite said diffraction grating, and light means within said box and controllable from outside the box for illuminating said spectrum-registering needle, whereby when light comes through said slit and falls on said replica of the diffraction grating and said levers are moved to locate the spectrum-registering needle in register with the line spectrum on the replica of the diffraction grating, the scale moving needle moves along said graduated scale to indicate the wave length of the line spectrum.

2. A spectrometer as claimed in claim 1 in which said scale has a slot therealong and said scale moving needle is engaged in said slot for coupling said scale and said first lever.

3. A spectrometer as claimed in claim 1 in which said light means comprises a lamp, a battery electrically coupled with said lamp, and switch means coupled between said battery and said lamp for turning said lamp on and off.

* * * * *